United States Patent [19]
Lindner et al.

[11] Patent Number: 5,414,035
[45] Date of Patent: May 9, 1995

[54] CALENDERED RIGID VINYL POLYMER COMPOSITIONS

[75] Inventors: Robert Lindner, N. Walies, Pa.; Vincent Clarke, Union, N.J.

[73] Assignee: AlliedSignal Inc., Morris Township, Morris County, N.J.

[21] Appl. No.: 270,078

[22] Filed: Jul. 1, 1994

[51] Int. Cl.⁶ .............................................. C08K 5/57
[52] U.S. Cl. ................................... 524/181; 524/180; 524/182; 524/310; 524/314; 524/487; 524/490; 524/491; 525/239; 525/240; 525/384; 525/387; 525/388
[58] Field of Search ............... 524/487, 490, 491, 489, 524/310, 314, 178, 180, 181, 182; 525/239, 240, 384, 387, 388

[56] References Cited

U.S. PATENT DOCUMENTS

| | | | |
|---|---|---|---|
| 4,040,997 | 8/1977 | Vunno et al. | 524/178 |
| 4,132,691 | 1/1979 | Ejk | 524/178 |
| 4,157,990 | 6/1979 | Lindner et al. | 524/314 |
| 4,203,880 | 5/1980 | Stoloff et al. | 525/214 |
| 4,218,353 | 8/1980 | Kim | 106/270 |
| 4,332,702 | 6/1982 | Lindner | 524/178 |
| 4,336,176 | 6/1982 | Lindner | 524/310 |
| 4,518,732 | 5/1985 | Bussing et al. | 524/178 |
| 5,002,989 | 3/1991 | Naumovitz et al. | 524/487 |
| 5,232,967 | 8/1993 | Worschech et al. | 524/314 |

OTHER PUBLICATIONS

Waxes as Lubricants In Plastics Processing, Luenther Illmann SPE Journal pp. 71–77 (1967).
Characterization of Lubricants for Polyvinyl Chlorde, L. King and F. Noel, Polymer Engineering and Science, (1972), vol. 12, No. 2 pp. 112–119.
The Use of Low Molecular Weight Polyethylene in Rigid PVC Lubrication, David Hurwitz, pp. 349–354 (1973), Society of Plastics Engineers–31st Annual Tech. Conf. Quebec, Canada.
Recommended Concentrations of A–C Polyethylene Lubricants for PVC Processing (1973) Allied Chem.
A–C Polyethylenes as Lubricants in Vinyl Processing (1984)–Allied Chemical Corp.
External lubricants that speed fusion, By Robert Lindner–Plastics Compounding, Sep./Oct. 1989.
Technical Data for Low Molecular Weight Polyethylenes and Derivatives, pp. 2–26 Allied Signal.
Plastics Additives Handbook, Stabilizers, Processing Aids, Plasticizers, Fillers, Reinforcements, Colorants for Thermoplastics (1990) p. 468, R. Gachter et al, Hanser Publ. ed.
The Use of A–C Polyethylenes In Processing PVC–Allied Signal Corp.

*Primary Examiner*—Veronica P. Hoke
*Attorney, Agent, or Firm*—Melanie L. Brown; Roger H. Criss

[57] ABSTRACT

The present invention provides an external lubricant composition for calendered vinyl polymer. The external lubricant provides rigid vinyl polymer compositions having improved plate out resistance, clarity, release, and stability. The external lubricant comprises an effective amount for lubricating vinyl polymer of polyethylene having a Brookfield viscosity at a temperature of 150° C. of greater than about 85,000 centipoises and an acid number as determined by standardized titration of KOH of between about 5 and about 9.

Sheets of the calendered vinyl polymer are used for blister packs and credit cards.

20 Claims, No Drawings

CALENDERED RIGID VINYL POLYMER COMPOSITIONS

The present invention relates to calendered rigid vinyl polymer compositions.

BACKGROUND OF THE INVENTION

Rigid vinyl polymer compositions, such as polyvinyl chloride compositions, are utilized for producing a variety of structural articles such as plastic pipe, siding, containers, and sheets. These rigid compositions are substantially unplasticized. Sheets are typically made by calendering which involves passing the material between rollers, Because the resulting sheets are typically used for blister packs and credit cards, a very clear final product is highly desirable, In order to stabilize vinyl polymer against the decomposing influence of heat and light, tin stabilizers including organotin stabilizers such as organotin mercaptides and organotin sulfides are used to stabilize vinyl polymers.

Lubricants are also added to vinyl polymers to facilitate the extrusion or other melt processing of the structural articles produced, Lubricants are generally classified as external or internal lubricants, An external lubricant provides a lubricating layer between the plastic melt and the metallic surfaces of the processing equipment. The external lubricant serves to coat the individual particles of the polymeric resin and inhibits their adherence to the metallic surfaces. In contrast, an internal lubricant reduces the effective melt viscosity of the vinyl polymer at the processing temperatures in order to improve its flow properties during processing as well as to promote fusion. An internal lubricant is generally needed only for thin extrusions such as films and thin-walled pipe.

The suitability of lubricants for vinyl polymer is determined by the type of stabilizer used in the vinyl polymer. For example, the PLASTICS ADDITIVE HANDBOOK, 3rd Edition (Hanser Publishers 1990) teaches that oxidized polyethylene waxes are suitable lubricants for tin stabilized polyvinyl chloride sheets.

Known tin stabilized rigid polyvinyl chloride calendered sheet formulations include compositions such as:

| Rigid 4-Cell Resin | 100 phr |
|---|---|
| Organotin Stabilizer | 2.0 |
| Acrylic Processing Aid | 3.0 | which is disclosed by David Hurwitz, "The Use of Low Molecular Weight Polyethylene in Rigid PVC Lubrication", Society of Plastics Engineers, 31st Annual Technical Conference, 349 (May 1973), and

| PVC | 100 phr |
|---|---|
| Processing Aid | 1.5 |
| Glycerol Mono-Oleate | 1.0 |
| Octyl Sn Stabilizer | 1.6 |
| Impact Modifier | 5–10 |
| A-C ® 316 (oxidized homopolymer polyethylene wax, acid number of 16) | 0.05–0.3 | which is disclosed in A-C ® POLYETHYLENES FOR PVC by AlliedSignal Inc. (1986). See also Technical Data on A-C ® Polyethylenes and Copolymers for Plastics by AlliedSignal Inc. (1973) which teaches that A-C ® 392A (high density oxidized polyethylene wax having an acid number of 30) is useful for tin stabilized polyvinyl chloride. See also Technical Data on A-C ® Polyethylenes for Plastics by Allied (1984) which teaches that A-C ® 31 6A (high density oxidized polyethylene wax having an acid number of 16) or A-C ® 330 (high density oxidized polyethylene wax having an acid number of 30) is useful for tin stabilized calendered polyvinyl chloride.

U.S. Pat. No. 4,203,880 discloses tin stabilized polyvinyl chloride having a lubricant package comprising oxidized polyethylene wax having an acid number greater than 5 and a melt viscosity of 1,000 to 60,000 centipoises at 140° C. and a known external lubricant such as paraffin oils, paraffin waxes, liquid and solid hydrocarbons, unoxidized polyethylene waxes, montan ester waxes, lead stearate, mineral oil, 12-hydroxystearic acid, ethylene bis-stearamide, and glycol esters of fatty acids that contain 10 to 20 or more carbon atoms.

It would be desirable to have a calendered vinyl polymer composition which has improved plate out resistance, clarity, release, and stability improved plate out resistance compared with currently used calendered vinyl polymer compositions.

SUMMARY OF THE INVENTION

We have found a composition which responds to the foregoing need in the art. Surprisingly, we have found an external lubricant composition for vinyl polymer wherein the external lubricant provides improved plate out resistance, clarity, release, and stability.

Thus, the present invention provides a composition comprising: (a) vinyl polymer; (b) an effective amount for stabilizing the vinyl polymer of tin stabilizer; and (c) an effective amount for lubricating the vinyl polymer of polyethylene having a Brookfield viscosity at a temperature of 140° C. of greater than about 85,000 centipoises and an acid number as determined by standardized titration of KOH of between about 5 and about 9. If measured at a temperature of 150° C., the polyethylene has a Brookfield viscosity of about 40,000 to about 60,000 centipoises.

The present invention also provides a calendered sheet comprising: (a) vinyl polymer; (b) an effective amount for stabilizing the vinyl polymer of tin stabilizer; and (c) an effective amount for lubricating the vinyl polymer of polyethylene having a Brookfield viscosity at a temperature of 140° C. of greater than about 85,000 centipoises and an acid number as determined by standardized titration of KOH of between about 5 and about 9.

The present composition and calendered sheets made from the present composition advantageously have improved plate out resistance and light transmittance compared with the known composition having an external lubricant of pentaerythritol adipate stearate.

Other advantages of the present invention will be apparent from the following description and attached claims.

DETAILED DESCRIPTION OF THE PREFERRED EMBODIMENTS

Vinyl polymers useful in the present invention include polyvinyl chloride and polymerized forms of vinyl acetate, vinyl chloride-vinyl acetate copolymers, vinylidene halides such as vinylidene chloride, vinyl pyridine, vinyl carbazole styrene, vinylbenzene, acrylic esters such as methyl acrylate, ethyl acrylate, or methylmethacrylate as well as acrylonitrile. The preferred vinyl polymer is polyvinyl chloride which includes both homopolymers of vinyl chloride and both copolymers and terpolymers of vinyl chloride with comonomers such as vinyl acetate, vinyl formate, alkyl vinyl ethers, ethylene, propylene, butylene, vinylidene chloride, alkyl acrylates and methacrylates, alkyl maleates, and alkyl fumarates. Preferably, at least 80% and more preferably 100% of the monomer to be polymerized will be a vinyl chloride monomer. Vinyl polymers useful in the present invention are commercially available.

Stabilizers useful in the present invention include cadmium, barium, zinc, and calcium salts; and tin stabilizers such as tin maleated and tin thioglycolates. Tin stabilizers are preferred. A more preferred tin stabilizer is octyltin thioglycolates. Tin stabilizers useful in the present invention are commercially available. Other useful tin stabilizers are disclosed in U.S. Pat. No. 4,203,880 which is incorporated herein by reference.

An effective amount for stabilizing the vinyl polymer of the tin stabilizer is used. Typically, the tin stabilizer is present in an amount of about 0.25 to about 5 parts by weight per 100 parts of vinyl polymer.

The polyethylene of the present invention has a Brookfield viscosity at a temperature of 140° C. of greater than about 85,000 centipoises and an acid number as determined by standardized titration of KOH of between about 5 and about 9. If measured at a temperature of 150° C., the polyethylene has a Brookfield viscosity of about 40,000 to about 60,000 centipoises.

Suitable polyethylenes may be characterized as oxidized high density homopolymers of ethylene, copolymers containing acrylates and ethylene, terpolymers containing acrylates, esters, and ethylene. Preferably, oxidized high density homopolymers of ethylene are used. These polyethylenes have been oxidized to an acid number as determined by a standardized titration of KOH of more preferably between about I and about 12 and most preferably between about 5 and about 9.

Suitable oxidized polyethylenes are available from AlliedSignal Inc., Morristown, N.J. A preferred oxidized polyethylene is listed in the following Table:

| Oxidized Polyethylene | Acid Number (mgKOH/gram) | Density (grams/cc) | Brookfield Viscosity (cps at 140° C.) |
| --- | --- | --- | --- |
| A-C ® 307A | 5–9 | 0.98 | ≧85,000 |

These oxidized polyethylenes as well as others which are useful in the practice of the present invention may be obtained by oxidizing polyethylenes with air or oxygen by convention procedures. Suitable methods are described in U.S. Pat. No. 3,060,163 and 3,322,711 which are incorporated herein by reference. As those skilled in the art know, the oxidation results in the scission of the polymer and the formation of acid groups. In addition to the formation of acid groups on the polymer chain, esters, aldehydes, ketones, hydroxides, and peroxides are also found in various quantities along the polymer chains.

If too little lubricant is present in the final vinyl polymer composition, the melt viscosity of the vinyl polymer composition may be too high or the fusion time may be too short. An extremely short fusion time is undesirable for extrudable compositions because this may result in prolonged exposure of the polymer melt to elevated temperatures which results in premature degradation. If too much lubricant is present in the final vinyl polymer composition, a condition referred to as "plate out" may occur. The excess lubricant rises to the surface of the vinyl polymer composition and remains in contact with the heated wall of the extruder, mill, or calendar roll for a sufficient time to become charred. The char is either carried along with the molten polymer causing discoloration, or the char may form deposits along the inner wall or in the die of an extruder, thereby altering the shape of the extruded or calendered article.

An effective amount for lubricating the vinyl polymer of oxidized polyethylene is used. Typically, the oxidized polyethylene is present in an amount of about 0.01 to about 10 parts by weight per 100 parts of vinyl polymer. The oxidized polyethylene is present preferably in an amount of about 0.05 to about 5 parts by weight per 100 parts of vinyl polymer, more preferably in an amount of about 0.05 to about 1 part by weight per 100 parts of vinyl polymer, and most preferably in an amount of about 0. 1 to about I part by weight per 100 parts of vinyl polymer.

In addition to the heat stabilizer and external lubricant, the present compositions may contain one or more additives conventionally employed in polymer compositions. These additives include fillers such as alkaline earth metal carbonates, pigments such as titanium dioxide, antioxidants such as sterically hindered phenols or bis-phenols, impact modifiers such as methyl methacrylatebutadiene-styrene terpolymers, and adsorbents such as the alkaline earth metal silicates and diatomaceous earth if the composition contains a significant amount of liquid ingredients.

The vinyl compositions to which the present external lubricants are added are rigid which means that they contain essentially no plasticizer. Such vinyl resins are useful in the production of rigid articles, principally rigid pipe, siding, containers, and sheets.

It is known that the effectiveness of lubricants on resin formulations may be evaluated by measurement of rheological properties of the formulation. These properties are typically studied by means of a torque rheometer consisting of a miniature mixer and a torque meter which measure the load on the mixer. The mixing forces developed within a sample of material at a certain temperature cause a deflection of a recording dynamometer. This deflection is recorded on a strip chart. This torque, which is expressed in metergrams, is directly related to the viscosity of the melt being mixed. When a polymer of the vinyl type degrades, it crosslinks rapidly and shows a sharp rise in its melt viscosity. The time for this to occur is a measure of the thermal stability under dynamic shear conditions. A typical torque rheometer curve provides one skilled in the art with information as to melting, fusion, flow, and crosslinking in the processing of the polymer tested. This procedure is set forth in ASTM D 2538-88—"Standard Practice for Fusion of Poly(Vinyl Chloride)(PVC) Compounds Using a Torque Rheometer".

The most generally used rheometer is the Brabender Plasticorder which essentially consists of an oil-heated roller mixing head driven by a variable speed motor equipped with means to measure the torque developed in the head. The machine is fitted with a mixing head equipped with a melt thermocouple. To determine the fusion time of a polyvinyl chloride powder blend, for example, an accurately weighed quantity of the blend is charged into the mixing head with the aid of a quick-loading chute. A graph of the torque against time is produced and the point when fusion is complete is shown by an initial peak in torque. The dynamic heat stability is measured in minutes from the start of the graph until the decomposition point which is marked by a rise in torque.

The present invention is more fully illustrated by the following non-limiting Examples. Unless otherwise stated, all parts are by weight.

COMPARATIVES AND EXAMPLES

For each Example, the effect of the present external lubricants for calendered polyvinyl chloride sheet compounds was determined utilizing a Brabender Plasticorder at 190° C. jacket temperature, at 60 RPM, and sample size of 40×SPG. Each composition was prepared by blending in a Henschel mixer for 10 minutes at 3800 RPM and for an additional 10 minutes at 2600 RPM.

The light transmittance was measured by spectrophotometry using a Macbeth Coloreye 3000. Injection molded samples of clear rigid polyvinyl chloride with the following dimensions were used (1.5"×1"×⅛"). The transmittance was determined using a D65 light source, which is representative of Northeastern daylight and a 10° standard observer. CIELAB was the method of calculation for the amount of light transmission through each sample. Glass was used as the standard.

Spiral flow was measured by using the following equipment. The injection molding machine was Kawaguchi K25C (1oz, reciprocating screw type). The mold was custom made, multi-cavity for thermoplastics. The cavity was 174", half round spiral, 4 turns, maximum radius 1.5 ", 5 mm markings, filled from edge. The injection molding parameters were standard rigid PVC conditions. The procedure was injection mold 1-2 dozen spirals, determine ultimate lengths, and select median value.

The two row-mill tack test determined the time taken for the external lubricant system of the compound to break down and thus, cause the compound to stick to the metal surfaces of the mill. The mill was set-up under the conditions set forth below.

180 grams of each compound were used. The test procedure was as follows: (1) The mill rolls were cleaned using stearic acid. (2) The mill was left running for ten minutes to enable the temperature to equilibrate. (3) The compound was added between the rolls nip until it banded, i.e., stuck to the rolls. (4) The time to banding was noted. (5) Using a brass knife and alternating from left to right, the banded sheet was cut and folded 12 times. (6) After 5 minutes, the sheet was removed from the rolls and reeled through the nip. (7) Steps 5-8 were repeated until the sheet could no longer be removed from the rolls. This time was noted and designated as stick time.

The present lubricant used was A-C ® 307A oxidized polyethylene which is commercially available from AlliedSignal Inc., Morristown, N.J., United States of America. The properties of this oxidized polyethylene are as follows:

| Oxidized Polyethylene | Acid Number (mgKOH/gram) | Density (grams/cc) | Brookfield Viscosity (cps at 140° C.) |
|---|---|---|---|
| A-C ® 307A | 5-9 | 0.98 | ≧85,000 |

The Comparatives were run in the same manner as the Examples except that currently used external lubricants were used instead of the present external lubricants.

For each Comparative and Example, the resin used was Shintech 650 PVC Resin K56-58 and the modifier used was Kanace B22 which is MBS. The tin stabilizers used were Thermolite 83 which is octyltin thioglycolate and Thermolite 890 which is octyltin thioglycolate. The internal lubricant used was Loxiol G16 which is glycerol ester or Lubol 515 which is glycerol ester. The external lubricant used was Loxiol G70S which is pentaerythritol adipate stearate or A-C ® 316 high density oxidized polyethylene wax having an acid number of 16 and a Brookfield viscosity of 8,500 centipoises measured at 140° C.

| COMPARATIVE A AND EXAMPLE 1 | | |
|---|---|---|
| Component | COMP. A | EXAMPLE 1 |
| PVC | 100 | 100 |
| Modifier | 5.00 | 5.00 |
| Thermolite 831 | 1.25 | 1.25 |
| Thermolite 890 | 1.25 | 1.25 |
| Loxiol G16 or Lubol 516 | 0.75 | 0.875 |
| Loxiol G70S | 0.25 | — |
| A-C ® 307 Polyethylene | — | 0.125 |
| Brabender Fusion Test (165° C., 30 RPM, 54 g): Fusion Time (minutes) | 1.3 | 1.2 |
| Maximum Torque (meter-grams) | 3200 | 2800 |
| Equilibrium Torque (meter-grams) | 2075 | 2100 |
| Brabender Stability (190° C., 60 RPM, 54 g): Stability Time (minutes) | 29 | 38 |
| Maximum Torque (meter-grams) | 3400 | 3300 |
| Equilibrium Torque (meter-grams) | 1150 | 1200 |
| Fusion-Time (minutes) | 0.3 | 0.3 |
| Spiral Flow (centimeters) | 54 | 53 |
| Light Transmittance | 88.98 | 93.43 |
| Two Roll Mill Tack Test: Time to Sticking (minutes) | 20 | 60 |
| 172° C./163° C./23 RPM 15 mill | Stuck | No Sticking |
| Plate Out Observation | None | None |

COMPARATIVES B THROUGH I AND EXAMPLES 2 THROUGH 4

For Comparatives B through I and Examples 2 through 4, the type and amount of external lubricant were varied. The other components as set forth in the following Table remained the same:

| | |
|---|---|
| PVC | 100 PHR |
| Modifier | 5 PHR |
| Sn Stabilizer | 1.25 PHR |
| Internal Lubricant | 0.75 PHR |

For Comparatives B and C and Example 2, the test conditions were as follows:

|  | Set Temperature (°C.) | Stock Temperature (°C.) | Roll Speed (RPM) |
|---|---|---|---|
| Front Roll | 204 | 171 | 18.5 |
| Back Roll | 193 | 163 | 23 |

The nip gap was 15 mils. In order to get a stick time, the amount of external lubricant used was cut in half compared with the amount of external lubricant used in Comparative A and Example 1.

|  | EXTERNAL LUBRICANT | BAND TIME | STICK TIME |
|---|---|---|---|
| COMP. B | 0.125 Loxiol G70S | 30 seconds to 1 minute | 20 minutes |
| COMP. C | 0.0625 A-C ® 316 Polyethylene | 30 seconds to 1 minute | After one hour, no sticking. |
| EXAMPLE 2 | 0.0625 A-C ® 307 Polyethylene | 30 seconds to 1 minute | After one hour, no sticking. |

For Comparative B, no visible plate out occurred but the product had a slightly brownish tint when banded and a few blemishes on the surface so that a clear product did not result. For Comparative C, plate out occurred on the initial roll but seemed to clear up with possible blue haze on the rolls and more blemishes occurred on the surface compared with Comparative B but no brownish tint occurred. For Example 2, plate out occurred on the initial roll but seemed to clear up with possible blue haze on the roll surface and more blemishes occurred on the surface compared with Comparative C but no brownish tint occurred.

For Comparatives D and E and Example 3, higher roller temperatures were used as follows in order to get a stick time for the Loxiol G70S:

|  | Set Temperature (°C.) | Stock Temperature (°C.) | Roll Speed (RPM) |
|---|---|---|---|
| Front Roll | 216 | 185 | 18.5 |
| Back Roll | 204 | 177 | 23 |

The nip gap was 15 mils.

|  | EXTERNAL LUBRICANT | BAND TIME | STICK TIME |
|---|---|---|---|
| COMP. D | 0.125 Loxiol G70S | 0 to 30 seconds | 5 minutes |
| COMP. E | 0.0625 A-C ® 316 Polyethylene | 0 to 30 seconds | After 30 minutes, no sticking. |
| EXAMPLE 3 | 0.0625 A-C ® 307 Polyethylene | 0 to 30 seconds | After 1.5 hours, no sticking. |

For Comparative D, no plate out occurred but the product had a slightly brownish tint in banding and a few blemishes on the surface so that a clear product did not result. For Comparative E, plate out occurred on the initial roll and more blemishes occurred on the surface compared with Comparative D but no brownish tint occurred. For Example 3, plate out occurred on the initial roll and more blemishes occurred on the surface compared with Comparative E but no brownish tint occurred.

For Comparatives F and G and Example 4, the amount of external lubricant used was increased to determine if plate out would occur:

|  | EXTERNAL LUBRICANT | BAND TIME | STICK TIME |
|---|---|---|---|
| COMP. F | 0.25 Loxiol G70S | 0 to 30 seconds | After 40 minutes, no sticking. |
| COMP. G | 0.125 A-C ® 316 Polyethylene | 0 to 30 seconds | After 40 minutes, no sticking. |
| EXAMPLE 4 | 0.125 A-C ® 307 Polyethylene | 0 to 30 seconds | After 40 minutes, no sticking. |

For Comparative F, no plate out occurred but some blemishes occurred on the surface so that a clear product did not result. For Comparative G, plate out occurred on the initial roll but cleared up after banding and more blemishes occurred on the surface compared with Comparative F but overall, the color was better. For Example 4, plate out occurred on the initial roll that seemed to clear up after banding and more blemishes occurred on the surface compared with Comparative G.

For Comparatives H and I, the amount of A-C ® 316 Polyethylene was reduced in order to try and get a stick time.

|  | EXTERNAL LUBRICANT | BAND TIME | STICK TIME |
|---|---|---|---|
| COMP. H | 0.03125 A-C ® 316 Polyethylene | 0 to 30 seconds | Stuck after 5 minutes. |
| COMP. I | 0.0416 A-C ® 316 Polyethylene | 0 to 30 seconds | After 30 minutes, no sticking. |

Field trials have shown that A-C ® 316 polyethylene plates out with time whereas with A-C ® 307 polyethylene, no plate out has been observed.

What is claimed is:
1. A composition comprising:
   (a) a vinyl polymer;
   (b) an effective amount for stabilizing said vinyl polymer of tin stabilizer; and
   (c) an effective amount for lubricating said vinyl polymer of polyethylene having a Brookfield viscosity at a temperature of 140° C. of greater than about 85,000 centipoises and an acid number as determined by standardized titration of KOH of between about 5 and about 9.
2. The composition of claim 1 wherein said vinyl polymer is polyvinyl chloride.
3. The composition of claim 1 wherein said tin stabilizer is a tin thioglycolate.
4. The composition of claim 3 wherein said tin thioglycolate is octyltin thioglycolate.
5. The composition of claim 1 wherein said polyethylene is present in an amount of about 0.01 to about 10 parts by weight per 100 parts of said vinyl polymer.
6. The composition of claim 1 wherein said polyethylene is present in an amount of about 0.05 to about 5 parts by weight per 100 parts of said vinyl polymer.
7. The composition of claim 1 wherein said polyethylene is present in an amount of about 0.05 to about 1 part by weight per 100 parts of said vinyl polymer.
8. The composition of claim 1 wherein said polyethylene is present in an amount of about 0.1 to about 1 part by weight per 100 parts of said vinyl polymer.
9. The composition of claim 1 wherein said composition has improved plate out resistance compared with a composition of vinyl polymer, tin stabilizer, and pentaerythritol adipate stearate.

10. The composition of claim 1 wherein said composition has improved light transmittance compared with a composition of vinyl polymer, tin stabilizer, and pentaerythritol adipate stearate.

11. A calendered sheet comprising:
(a) a vinyl polymer;
(b) an effective amount for stabilizing said vinyl polymer of tin stabilizer; and
(c) an effective amount for lubricating said vinyl polymer of polyethylene having a Brookfield viscosity at a temperature of 140° C. of greater than about 85,000 centipoises and an acid number as determined by standardized titration of KOH of between about 5 and about 9.

12. The calendered sheet of claim 11 wherein said vinyl polymer is polyvinyl chloride.

13. The calendered sheet of claim 11 wherein said tin stabilizer is a tin thioglycolate.

14. The calendered sheet of claim 11 wherein said tin thioglycolate is octyltin thioglycolate.

15. The calendered sheet of claim 11 wherein said polyethylene is present in an amount of about 0.01 to about 10 parts by weight per 100 parts of said vinyl polymer.

16. The calendered sheet of claim 11 wherein said polyethylene is present in an amount of about 0.05 to about 5 parts by weight per 100 parts of said vinyl polymer.

17. The calendered sheet of claim 11 wherein said polyethylene is present in an amount of about 0.05 to about 1 part by weight per 100 parts of said vinyl polymer.

18. The calendered sheet of claim 11 wherein said polyethylene is present in an amount of about 0.1 to about 1 part by weight per 100 parts of said vinyl polymer.

19. The calendered sheet of claim 11 wherein said calendered sheet has improved plate out resistance compared with a calendered sheet of vinyl polymer, tin stabilizer, and pentaerythritol adipate stearate.

20. The calendered sheet of claim 11 wherein said calendered sheet has improved light transmittance compared with a calendered sheet of vinyl polymer, tin stabilizer, and pentaerythritol adipate stearate.

* * * * *